(12) United States Patent
Reyes

(10) Patent No.: US 6,321,579 B1
(45) Date of Patent: *Nov. 27, 2001

(54) PORTABLE ANTI-THEFT LOCKING ANCHOR

(75) Inventor: Gregg Reyes, Petaluma, CA (US)

(73) Assignee: Micro Security Devices Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/623,395

(22) PCT Filed: Nov. 12, 1999

(86) PCT No.: PCT/US99/26638

§ 371 Date: Sep. 1, 2000

§ 102(e) Date: Sep. 1, 2000

(87) PCT Pub. No.: WO00/29700

PCT Pub. Date: May 25, 2000

(51) Int. Cl.[7] ................................................. E05B 65/00
(52) U.S. Cl. ..................................... 70/58; 70/18; 70/14
(58) Field of Search ............................. 70/18, 14, 58, 70/57, 168, 163, 928, 166–169, 424; 292/DIG. 51, DIG. 55, 124, 132, 98, 224, 234, 197

(56) References Cited

U.S. PATENT DOCUMENTS

| | | | |
|---|---|---|---|
| 442,778 | * 12/1890 | Metzger | 70/58 |
| 505,299 | 9/1893 | Schneider . | |
| 606,734 | 7/1898 | Olmstead | 70/428 |
| 611,646 | 10/1898 | Parker | 70/438 |
| 786,842 | 4/1905 | Robeson . | |
| 881,364 | 3/1908 | Wheeler | 70/424 |
| 934,928 | 9/1909 | Michel | 70/428 |
| 942,537 | 12/1909 | Batdorf . | |
| 1,452,471 | 4/1923 | Kline | 70/168 |
| 2,480,662 | 8/1949 | McKinzie | 42/85 |

(List continued on next page.)

FOREIGN PATENT DOCUMENTS

| | | | |
|---|---|---|---|
| 987121 | 4/1976 | (CA) | 70/11 |
| 335741 | 11/1919 | (DE) . | |
| 329934 | 12/1920 | (DE) . | |
| 577757 | 6/1933 | (DE) | 70/428 |
| 877220 | 11/1940 | (FR) . | |
| 1026519 | 10/1950 | (FR) . | |
| 2308006 | 11/1976 | (FR) . | |
| 2636686 | 3/1990 | (FR) . | |
| 447091 | 5/1936 | (GB) . | |
| 1376011 | 12/1974 | (GB) . | |

OTHER PUBLICATIONS

"Cable and Lock Security Systems," *Product Advertisement*, Kensington Security Systems.
"Kablit Security System," *Computer and Office Equipment Security Catalogue*, Secure–It,Inc., 1990.
Pending U.S. Patent Application (number unknown) filed by and assigned to Port, Inc.

Primary Examiner—Darnell Jayne
(74) Attorney, Agent, or Firm—Dergosits & Noah LLP

(57) ABSTRACT

An locking device that cooperates with a predefined rectangular slot built into an external wall of the equipment to be secured. The locking device preferably includes a cylindrical body having a recessed area formed coaxially within the body. A cam assembly and a hook arm assembly are fitted within the recessed area and operably coupled to engage and release from the security slot.

19 Claims, 1 Drawing Sheet

U.S. PATENT DOCUMENTS

| | | |
|---|---|---|
| 2,594,012 | 4/1952 | Griffin .................................... 220/55 |
| 2,660,084 | 11/1953 | Newman . |
| 2,677,261 | 5/1954 | Jacobi ..................................... 70/14 |
| 2,729,418 | 1/1956 | Maynard ............................... 248/361 |
| 2,800,090 | 7/1957 | Reid ....................................... 109/59 |
| 3,039,727 | 6/1962 | Engel, Jr. et al. .................... 248/245 |
| 3,136,017 | 6/1964 | Preziosi ................................. 24/221 |
| 3,200,694 | 8/1965 | Rapata . |
| 3,220,077 | 11/1965 | Newcomer, Jr. et al. ............. 24/221 |
| 3,276,835 | 10/1966 | Hall ..................................... 312/333 |
| 3,299,839 | 1/1967 | Nordbak ............................... 108/152 |
| 3,469,874 | 9/1969 | Mercurio ................................. 292/5 |
| 3,664,163 | 5/1972 | Foote ....................................... 70/58 |
| 3,727,934 | 4/1973 | Averbook et al. ................ 280/11.37 |
| 3,785,183 | 1/1974 | Sander ..................................... 70/58 |
| 3,859,826 | 1/1975 | Singer et al. ............................ 70/58 |
| 3,866,873 | 2/1975 | Bohli ................................ 248/205 A |
| 3,986,780 | 10/1976 | Nivet ..................................... 403/353 |
| 4,004,440 | 1/1977 | Dreyer .................................... 70/15 |
| 4,028,913 | 6/1977 | Falk ......................................... 70/58 |
| 4,057,984 | 11/1977 | Avaiusini ................................ 70/58 |
| 4,065,083 | 12/1977 | Gassaway ............................. 248/19 |
| 4,131,001 | 12/1978 | Gotto ....................................... 70/14 |
| 4,212,175 | 7/1980 | Zakow ..................................... 70/58 |
| 4,223,542 | 9/1980 | Basseches ............................... 70/58 |
| 4,252,007 | 2/1981 | Kerley ..................................... 70/58 |
| 4,311,883 | 1/1982 | Kidney .............................. 179/189 R |
| 4,442,571 | 4/1984 | Davis et al. ......................... 411/552 |
| 4,462,233 | 7/1984 | Horetzke ............................... 70/428 |
| 4,527,405 | 7/1985 | Renick et al. ........................... 70/14 |
| 4,570,465 | 2/1986 | Bennett .................................... 70/18 |
| 4,584,856 | 4/1986 | Petersdorff et al. ..................... 70/57 |
| 4,616,490 | 10/1986 | Robbins .................................. 70/14 |
| 4,640,106 | 2/1987 | Derman .................................. 70/14 |
| 4,655,057 | 4/1987 | Derman .................................. 70/14 |
| 4,685,312 | 8/1987 | Lakoski et al. .......................... 70/14 |
| 4,691,891 | 9/1987 | Dionne ................................. 248/551 |
| 4,704,881 | 11/1987 | Sloop, Sr. .............................. 70/158 |
| 4,733,840 | 3/1988 | D'Amore .......................... 248/205.3 |
| 4,738,428 | 4/1988 | Themistos et al. ................... 248/551 |
| 4,801,232 | 1/1989 | Hempel ................................ 411/552 |
| 4,826,193 | 5/1989 | Davis ................................. 280/304.1 |
| 4,842,912 | 6/1989 | Hutter, III .............................. 428/65 |
| 4,843,848 | 7/1989 | Igelmund ................................ 70/58 |
| 4,856,304 | 8/1989 | Derman .................................. 70/14 |
| 4,858,455 | 8/1989 | Kuo ...................................... 70/491 |
| 4,907,716 | 3/1990 | Wankel et al. ....................... 220/326 |
| 4,918,952 | 4/1990 | Lakoski et al. .......................... 70/57 |
| 4,938,040 | 7/1990 | Humphreys, Jr. ....................... 70/58 |
| 4,959,979 | 10/1990 | Filipow et al. ......................... 70/58 |
| 4,979,382 | 12/1990 | Perry ....................................... 70/58 |
| 4,985,695 | 1/1991 | Wilkinson et al. .................. 340/571 |
| 4,993,244 | 2/1991 | Osman ..................................... 70/30 |
| 5,024,072 | 6/1991 | Lee ........................................ 70/491 |
| 5,050,836 | 9/1991 | Makous ................................ 248/553 |
| 5,082,232 | 1/1992 | Wilson ................................. 248/551 |
| 5,119,649 | 6/1992 | Spence .................................... 70/14 |
| 5,184,798 | 2/1993 | Wilson ................................. 248/551 |
| 5,190,466 | 3/1993 | McVey ................................. 439/304 |
| 5,197,706 | 3/1993 | Braithwaite et al. ................ 248/499 |
| 5,327,752 | 7/1994 | Myers et al. ............................ 70/58 |
| 5,381,685 | 1/1995 | Carl et al. ................................ 70/78 |
| 5,502,989 | 4/1996 | Murray, Jr. et al. ..................... 70/58 |
| 5,577,855 | 11/1996 | Leyden et al. ....................... 403/291 |
| 5,622,064 | 4/1997 | Gluskoter et al. ....................... 70/14 |
| 5,687,592 | 11/1997 | Penniman et al. ....................... 70/14 |
| 5,709,110 | 1/1998 | Greenfield et al. ...................... 70/58 |
| 5,983,679 | * 11/1999 | Reyes ...................................... 70/58 |
| 6,000,251 | * 12/1999 | Murray, Jr. et al. ..................... 70/58 |
| 6,006,557 | * 12/1999 | Carl et al. ................................ 70/58 |
| 6,058,744 | * 5/2000 | Ling . |
| 6,199,413 | * 3/2001 | McDaid et al. ......................... 70/58 |
| 6,205,824 | * 3/2001 | Miao ....................................... 70/58 |

\* cited by examiner

PORTABLE ANTI-THEFT LOCKING ANCHOR

TECHNICAL FIELD

The present invention relates generally to security devices used for preventing the theft of equipment, such as personal computers. The theft-deterrent device cooperates with a security slot in an external wall of the equipment.

BACKGROUND OF THE INVENTION

Computing has seen a dramatic shift from large, roomsized equipment accessible only to a few people to small, powerful portable computers which are economically available to the general public. The power of the new portable computers, the wide range and easy accessibility of software, and the rise in computer literacy during the last twenty years has fueled this change.

Another important trend is that corporations are under enormous pressure to become more efficient and profitable with significantly less staff. One solution has been to give individual employees a personal computer (PC). Originally, the only computer available was a desktop PC. However, the past five years have witnessed a tremendous shift towards easily transported and highly powerful portable computers. A direct outcome of this proliferation is that companies are storing invaluable corporate assets in the form of proprietary data on these small, easily stolen notebook computers.

Not surprisingly, theft of portable computers has also experienced a steep rise over the past few years, even as the price of the notebooks has declined. Frequently, the primary motivation for stealing a notebook is not the equipment itself but the data residing on it. Taking into account both the value of the hardware and the data, the 1996 losses incurred due to laptop computer theft were estimated at $805 million.

There are a number of methods for protecting notebooks against theft. PC Guardian (San Rafael, Calif.) and other manufacturers offer various solutions. One solution is a locking unit inserted into the diskette drive with a security cable which can be lassoed around a stationary object. Another approach uses a lock and small adhesive plate attached to the notebook, with a security cable. Another product utilizes a small security slot built into the external walls of some notebooks. Other common solutions include registering the serial number of the notebook with a central registry, or locking the notebook in a secure storage area at night.

All of the described solutions have problems associated with them. Use of the diskette drive is prohibited in many portables because the diskette drives oftentimes are removable. Use of a small adhesive plate is problematic because of the messiness of the installation and the adhesive plate has a tendency to catch when the portable is placed in its carrying case. The security slot solution does not always provide a snug fit and gives the perception of weakness. This solution also lacks the ability for multiple keying options. Locking up the portable in a secure storage area at night is just simply inconvenient.

The present invention provides a theft deterrent device which addresses these shortcomings of the prior art. The device is simple to use and it is secure and tight so as not to convey a profile of weakness.

SUMMARY OF THE INVENTION

A locking device that reduces the potential for theft of equipment such as personal computers is disclosed. The equipment to be secured has a rectangular slot with predefined dimensions built into its external wall. The locking device operably engages with the security slot to secure the equipment.

In the preferred embodiment, the locking device includes a cylindrical body having a recessed area formed coaxially within the body. A cam assembly and a hook arm assembly are fitted within the recessed area and operably coupled to engage and release from the security slot.

The body includes a latch end and a key end. The latch end has a latch opening contiguous with the recessed area and a pair of latch protrusions spaced apart on either side of the latch opening. The protrusions extend from the latch end of the body for mating engagement with the security slot. The key end has a keyway opening contiguous with the recessed area.

The cam assembly is fitted for axial rotation within a first portion of the recessed area proximate to the key end of the body. The cam assembly includes a keyway end and a hook arm end. The keyway end includes a predefined pattern for mating engagement with a key inserted through the keyway. The latch end includes a cam hole which is offset from the axis of the body.

The hook arm assembly is fitted within a second portion of the recessed area proximate to the latch end of the body. The hook arm assembly includes a pivot point centrally located on the hook arm assembly. The pivot point defines a pivot axis which is transverse to the body axis. A lever arm extends rigidly from the pivot point into the cam hole. A latch arm extends rigidly from the pivot point out the latch opening and between the protrusions. The latch arm includes a flanged lip on one end adjacent to the protrusions and adapted for mating engagement with the security slot.

In operation, a key is inserted through the keyway to engage the predefined pattern on the cam. Turning the key causes the cam to rotate, thereby causing the lever arm to be moved in the cam hole thereby pivoting the latch arm in an opposite direction to either engage with or release from the security slot.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
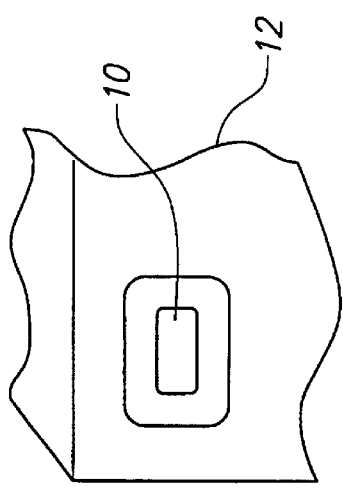
FIG. 1 is a front perspective view of a security slot in the external wall of a piece of equipment to be protected.

FIG. 1 illustrates a conventional security slot 10 provided on the external wall 12 of equipment to be secured, for example, a personal computer. In accord with industry practice, the slot 12 is generally rectangular in shape with dimensions substantially 3 mm by 7 mm and providing a lip or flange inside the upper portion of the slot that can be latched with a suitable latching mechanism.

The present invention is a locking device adapted to interact with the security slot 10 to secure equipment from theft. However, those having ordinary skill will recognize that the security slot and locking device can be configured with a great variety of different dimensions according to design choice without departing from the scope of the invention.

Figure 2:
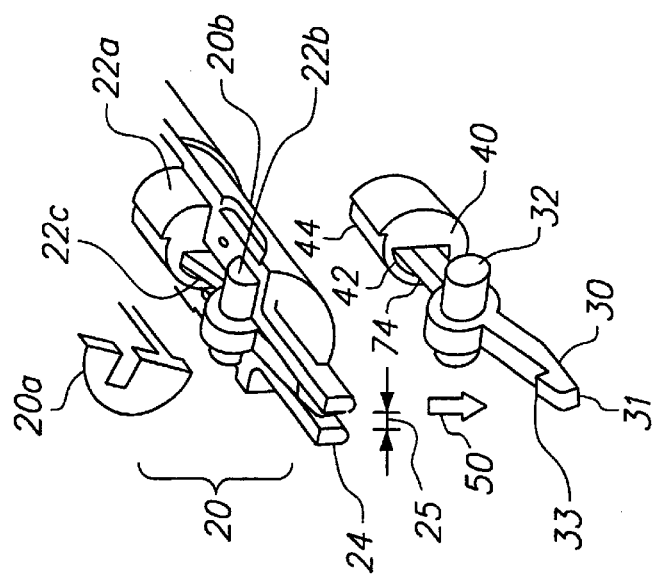
FIG. 2 is a front perspective view of the locking device of the present invention showing the cam in an unlocked position.

Referring now to FIG. 2, the preferred embodiment of a locking device in accord with the present invention is illustrated. The locking device includes an elongate body assembly 20 that is preferably cylindrical in shape and formed with a top half 20a and a bottom half 20b. Each half of the body assembly 20 is formed to include a symmetrical and corresponding hollowed-out recess 22 that is designed to accommodate a hook arm 30 and cam 40 as described below.

The body assembly 20 is preferably formed of molded aluminum, but other materials may be suitable, such as stainless or hardened steel or a combination of materials. The material must be strong enough to resist moderate stress, e.g., an attempt to break the device by twisting or other means. As shown for bottom half 20b, the recess 22 includes a first recess portion 22a sized to receive the cam 40 and a second recess portion 22b sized to receive a pivot pin 32 which is rigidly fixed in the center of hook arm 30. For example, the first recess portion 22a is a cylindrical area measuring 10.66 mm by 3.54 mm and the second recess portion 22b is a cylindrical area measuring 8.78 mm by 2.37 mm (diameter). A third recess portion 22c connects the first and second portions and measures approximately 9.16 mm by 2.43 mm by 3.51 mm. Each of the recess portions 22a–c is sized to loosely accommodate the hook and cam assembly as described more fully below.

The bottom half 20b of the body assembly 20 includes a pair of spaced-apart tabs or protrusions 24 rigidly protruding from the front of the body. The space 25 between the tabs 24 accommodates the hook end 31 of the hook arm 30. The dimension occupied by the tabs 24 and space 25 is approximately 3 mm by 7 mm, i.e., they are sized to operably interact with security slot 10. In this preferred embodiment, tabs 24 measure approximately 3 mm by 2.5 mm, and extend from the bottom half 20b by about 7.8 mm. Thus, space 25 is approximately 2 mm wide for receiving the hook end of the hook arm 30.

The hook arm 30 is also preferably formed of molded aluminum, stainless or hardened steel or a combination of materials, with a shape roughly as shown. The hook arm 30 is generally elongate in shape with a hook end 31 extending approximately 10.16 mm from a centrally located pivot pin 32. The hook end 31 further includes a lip or flanged portion 33 designed to latch against the inside surface of security slot 10.

The pivot pin 32 is rigidly oriented transversely to the elongate direction of the hook arm 30. The pivot pin 32 rests in the second recess portion 22b of the body assembly 20. A lever arm 34 extends from the pivot pin 32 in the other direction into opening 42 in cam 40. The lever arm 34 extends to operably rock the arm on pivot point 32 thereby moving the hook end 31 up and down to latch and unlatch, respectively, with corresponding hardware in security slot 10.

The cam 40 is preferably cylindrical and measures approximately 4.94 mm by 10.41 mm (diameter) and rests in the first recess portion 22a of the body assembly 20. The cam 40 includes an opening 42 in one end which is offset from the longitudinal axis of the body 20, and a predefined key pattern 44 on the other end adapted to receive key 45 for turning the cam.

Figure 3:
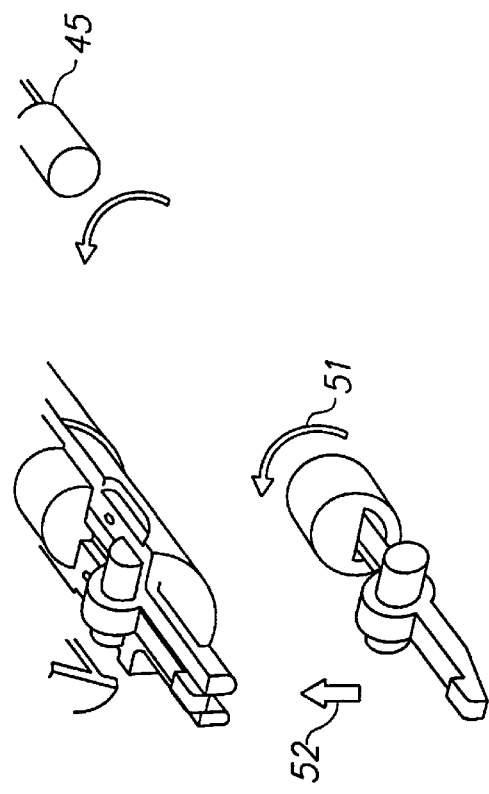
FIG. 3 is a front perspective view of the locking device of the present invention showing the cam in a locked position.

It can be seen in FIG. 2 that the lever arm 34 is raised by hole 42 when the cam 40 is operated to its unlocked position, thereby moving the hook portion 31 downward as shown by arrow 50 to release from the slot 10. In FIG. 3, the cam 40 is turned 90 degrees, as shown by arrow 51, to its locking position, where the lever arm 34 is lowered by the hole 42 and the hook portion 31 is raised as indicated by arrow 52, thereby latching against the slot 10.

It should be understood that the invention is not intended to be limited by the specifics of the above-described embodiment, but further defined by the accompanying claims.

I claim:

1. A locking apparatus utilizable for engagement with a security slot, comprising:

a cylindrical body having a latch end and a recessed area formed coaxially within the body, wherein the latch end has a latch opening contiguous with the recessed area and a pair of latch protrusions spaced apart on either side of the latch opening and extending from the latch end of the body parallel to the longitudinal axis of the body for mating engagement with the security slot; and a hook arm assembly fitted within the recessed area proximate to the latch end of the body, including a pivot point centrally located on the hook arm assembly and defining a pivot axis which is transverse to the longitudinal axis of the body, a lever arm rigidly extending longitudinally from the pivot point along the axis of the body into the recessed area, and a latch arm extending longitudinally from the pivot point out the latch opening and between said protrusions, said latch arm including a flanged lip on one end adjacent to the protrusions and adapted for mating engagement with the security slot;

wherein operable rotation of the lever arm about the pivot point axis causes the flanged lip of the latch arm to move in a substantially perpendicular path relative to the longitudinal axis of the body to either engage with or release from the security slot.

2. The locking apparatus of claim 1 further comprising:

locking mechanism having a first position and a second position, wherein the first position allows operable rotation of the lever arm about the pivot point and the second position prevents operable rotation of the lever arm about the pivot point in at least one direction.

3. The locking apparatus of claim 2 wherein:

the protrusions each include a flanged lip such that when the locking mechanism is in the second position the distance between a line between the flanged lips of the protrusions and the flanged lip of the latch arm is greater than 3.0 mm.

4. The locking apparatus of claim 2 wherein:

the locking mechanism includes a keyway having a predefined pattern for mating engagement with a key inserted through the keyway.

5. The locking apparatus of claim 4 wherein:

when the locking mechanism is in the second position the distance between a line between the flanged lips of the protrusions and the flanged lip of the latch arm is greater than 3.0 mm.

6. The locking apparatus of claim 1 further comprising:

a cam assembly which is fitted within the recessed area of the body and which engages the lever arm, wherein the cam assembly is adapted for limited rotation, such that when the cam assembly is rotated in one direction operable rotation of the lever arm about the pivot point is allowed and when the cam assembly is rotated in the opposite direction operable rotation of the lever arm is prevented in at least one direction.

7. The locking apparatus of claim 6 further comprising:
a locking mechanism which engages the cam having a first position and a second position, wherein the first position allows operable rotation of the lever arm about the pivot point and the second position prevents operable rotation of the lever arm about the pivot point in at least one direction.

8. The locking apparatus of claim 7 wherein:
when the locking mechanism is in the second position the distance between a line between the flanged lips of the protrusions and the flanged lip of the latch arm is greater than 3.0 mm.

9. The locking apparatus of claim 6 wherein:
the locking mechanism includes a keyway having a predefined pattern for mating engagement with a key inserted through the keyway.

10. A method of securing an object comprising the steps of:
providing a security slot in the object;
providing a locking apparatus comprising: a cylindrical body having a latch end and a recessed are a within the body, wherein a pair of substantially parallel latch protrusions extend from the latch end of the body, the protrusions each including a flanged lip which extends perpendicularly from the protrusions and which are adapted for mating engagement with the security slot, a hook mechanism fitted within the recessed area proximate to the latch end of the body, including a centrally-located pivot point, a lever arm rigidly extending longitudinally along the axis of the cylindrical body from the pivot axis which is transverse to the axis of the body, and a latch arm extending longitudinally from the pivot point out the latch opening and between said protrusions, said latch arm including a flanged lip on one end and adapted for mating engagement with the security slot;
providing a locking mechanism for locking the locking apparatus to the security slot;
rotating the lever arm about the pivot point such that the flanged lip of the latch arm is substantially aligned with the flanged lips of the protrusions;
inserting the latch arm and the protrusions of the locking apparatus into the slot of the object;
rotating the lever arm about the pivot point such that the flanged lip of the latch arm is substantially out of alignment with the flanged lips of the protrusions and the flanged lip of the latch arm and the flanged lips of the protrusions engage the object.

11. The method of securing an object of claim 10 wherein:
the locking mechanism engages the lever arm and prevents the hook mechanism from operable rotation about the pivot axis when actuated.

12. The method of securing an object of claim 10 wherein the locking mechanism further prevents operable rotation of the lever arm about the pivot point such that the flanged lip of the latch arm and the flanged lips of the protrusions can not be disengaged from the second surface of the object.

13. The method of securing an object of claim 10 wherein:
the slot is substantially rectangular in shape.

14. The method of securing an object of claim 13 wherein:
the slot has dimensions of approximately 3 mm by 7 mm.

15. The method of securing an object of claim 10 wherein:
the object is a computer.

16. A locking apparatus utilizable for engagement with a security slot, comprising:
a cylindrical body having a latch end and a recessed area within the body;
a pair of substantially parallel latch protrusions extending from the latch end of the body, the protrusions each including a flanged lip which extends perpendicularly from the protrusions and which are adapted for mating engagement with the security slot; and
a hook mechanism fitted within the recessed area proximate to the latch end of the body, including a centrally-located pivot point and defining a pivot axis which is transverse to the longitudinal axis of the body, a lever arm rigidly extending longitudinally along the body from the pivot point into the recessed area, and a latch arm extending longitudinally from the pivot point out the latch opening and between said protrusions, said latch arm including a flanged lip on one end and adapted for mating engagement with the security slot.

17. The locking apparatus of claim 16 further comprising:
a locking mechanism having a first position and a second position, wherein the first position allows operable rotation of the lever arm about the pivot point and the second position prevents operable rotation of the lever arm about the pivot point in at least one direction.

18. The locking apparatus of claim 16 wherein:
when the locking mechanism is in the second position the distance between a line between the flanged lips of the protrusions and the flanged lip of the latch cam is greater than 3.0 mm.

19. The locking apparatus of claim 16 further comprising:
a cam assembly which is fitted within the recessed area of the body and which engages the lever arm, wherein the cam assembly is adapted for limited rotation, such that when the cam assembly is rotated in one direction operable rotation of the lever arm about the pivot point is allowed and when the cam assembly is retated in the opposite direction operable rotation of the lever arm is prevented in at least one direction.

* * * * *

UNITED STATES PATENT AND TRADEMARK OFFICE
CERTIFICATE OF CORRECTION

| | | |
|---|---|---|
| PATENT NO. | : 6,321,579 B1 | |
| APPLICATION NO. | : 09/623395 | |
| DATED | : November 27, 2001 | |
| INVENTOR(S) | : Gregg Reyes | |

It is certified that error appears in the above-identified patent and that said Letters Patent is hereby corrected as shown below:

On the Title Page
Insert Item (63):

-- Related U.S. Application Data
(63) Continuation of application No. 09/193,741, filed on Nov. 17, 1998, now Pat. No. 5,983,679. --

In the Specifications
Column 1, after the title of the invention, line 3 should be:

-- This application is a U.S. National Stage entry under 35 U.S.C. § 371 of International Application No. PCT/US99/26638, filed November 12, 1999, and is a continuation of, and claims the benefit of priority under 35 U.S.C. § 120 and 35 U.S.C. § 365(c) to, commonly owned and assigned U.S. patent application Serial No. 09/193,741, filed on November 17, 1998, now U.S. Patent No. 5,983,679 and entitled "Portable Anti-Theft Locking Anchor." --

Signed and Sealed this
Thirtieth Day of April, 2013

Teresa Stanek Rea
*Acting Director of the United States Patent and Trademark Office*